United States Patent
Park et al.

(10) Patent No.: US 8,733,850 B2
(45) Date of Patent: May 27, 2014

(54) APPARATUS FOR CONTROLLING TENSION OF TRACK

(75) Inventors: Dong Hwa Park, Busan (KR); Jin Oh Kwon, Busan (KR); Cheol Hyun Cho, Busan (KR); Yoon Tae Nam, Busan (KR)

(73) Assignee: Dong-Il Rubber Belt Co., Ltd., Busan (KR)

( * ) Notice: Subject to any disclaimer, the term of this patent is extended or adjusted under 35 U.S.C. 154(b) by 269 days.

(21) Appl. No.: 13/376,255

(22) PCT Filed: Jun. 8, 2009

(86) PCT No.: PCT/KR2009/003061
§ 371 (c)(1),
(2), (4) Date: Dec. 5, 2011

(87) PCT Pub. No.: WO2010/143755
PCT Pub. Date: Dec. 16, 2010

(65) Prior Publication Data
US 2012/0080937 A1    Apr. 5, 2012

(51) Int. Cl.
*B62D 55/30*    (2006.01)
(52) U.S. Cl.
USPC .......................................... 305/145; 305/143
(58) Field of Classification Search
CPC ..................................................... B62D 55/305
USPC ................. 305/143, 144, 145, 146, 147, 148; 180/9.5
See application file for complete search history.

(56) References Cited

U.S. PATENT DOCUMENTS

| | | | | |
|---|---|---|---|---|
| 2,467,947 A | * | 4/1949 | Skelton | 180/9.5 |
| 3,774,708 A | * | 11/1973 | Purcell et al. | 180/9.5 |
| 3,826,325 A | * | 7/1974 | Purcell et al. | 180/9.54 |
| 3,841,424 A | * | 10/1974 | Purcell et al. | 180/9.5 |
| 4,230,378 A | | 10/1980 | Purcell et al. | |

(Continued)

FOREIGN PATENT DOCUMENTS

| | | |
|---|---|---|
| CN | 1665713 A | 9/2005 |
| DE | 3404517 A1 | 5/1985 |

(Continued)

OTHER PUBLICATIONS

International Search Report mailed Feb. 17, 2010 for corresponding International Patent Application No. PCT/KR2009/003061.

(Continued)

*Primary Examiner* — Kip T Kotter
(74) *Attorney, Agent, or Firm* — Swanson & Bratschun, L.L.C.

(57) ABSTRACT

An apparatus for controlling tension of a track, and more particularly to an apparatus for preventing a track wheel from separating due to an uneven road surface and obstacles on the road surface by minimizing space between a moving idler and roller when controlling the tension of the track, and for supporting the weight of a machine more safely by maximizing the space between a rear roller and a front roller. To this end, the present invention is characterized by: a track frame structure in which the idler and the front roller move together when controlling the tension of the track; and a damping member for absorbing external shock, wherein the idler is fixed in an idler frame, the front roller is fixed in a roller frame, and the buffer member is positioned between the idler frame and the roller frame.

3 Claims, 7 Drawing Sheets

(56) References Cited

U.S. PATENT DOCUMENTS

| | | | | |
|---|---|---|---|---|
| 4,339,156 A | * | 7/1982 | Livesay | 305/125 |
| 4,361,363 A | * | 11/1982 | Livesay | 305/125 |
| 7,025,429 B2 | * | 4/2006 | Yoshida et al. | 305/132 |
| 7,467,831 B2 | * | 12/2008 | Bertoni | 305/147 |
| 2005/0035654 A1 | | 2/2005 | Tamaru et al. | |

FOREIGN PATENT DOCUMENTS

| | | |
|---|---|---|
| EP | 0052417 A1 | 5/1982 |
| JP | S53-126637 | 11/1978 |
| JP | S57-501777 | 5/1982 |
| JP | 08-175442 | 7/1996 |
| JP | 2006-088766 | 4/2006 |
| KR | 100787367 | 12/2007 |
| WO | WO 2008/035931 A1 | 3/2008 |

OTHER PUBLICATIONS

European Search Report mailed Sep. 21, 2012 for corresponding European Application No. EP 09845849.

* cited by examiner

APPARATUS FOR CONTROLLING TENSION OF TRACK

RELATED APPLICATIONS

This application is a 35 U.S.C. §371 national phase application of PCT/KR2009/003061 (WO 2010/143755), filed on Jun. 8, 2009, entitled "Apparatus for Controlling Tension of Track", which is incorporated herein by reference in its entirety.

CROSS-REFERENCE(S) TO RELATED APPLICATIONS

The present invention is a national phase entry under 35 U.S.C. 371 of International Application No. PCT/KR2009/003061, filed on Jun. 8, 2009. The disclosure of said application is incorporated by reference herein.

BACKGROUND OF THE INVENTION

1. Field of the Invention

The present invention relates to an apparatus for controlling tension of a track, and more particularly to an apparatus for controlling tension of a track, which can prevent a track wheel from being separated due to an uneven road surface and obstacles on the road surface by minimizing space between a moving idler and a roller when controlling the tension of the track, and which can support the weight of a machine more safely by maximizing space between a rear roller and a front roller.

2. Description of Related Art

In a track frame of conventional construction equipment like in Korean Patent No. 10-787367, tension is controlled by moving only an idler when controlling the tension.

However, since the space between the idler and the roller is large, the track may be separated due to an uneven road surface and obstacles on the road surface when controlling the tension. Also since the space between rollers for supporting the equipment is relatively small, stability of the equipment is deteriorated.

Further, in a structure that the idler and the roller are moved at the same time, it is possible to improve the problem of the separation of the track and also to secure the stability of the construction equipment. However, a tension controlling cylinder having relatively high performance (high pressure) is needed due to the weight of the idler and the roller, and thus the idler and the tension controlling cylinder may be damaged by large external shock generated in a moment when operating the construction equipment. Further, since the construction equipment cannot deal with even small shock, the shock and vibration is transmitted to an operator, and thus it has a rough ride.

SUMMARY OF THE INVENTION

An embodiment of the present invention is directed to providing an apparatus for controlling tension of a track, which can prevent a track wheel from being separated due to an uneven road surface and obstacles on the road surface, and can support the weight of the equipment more safely by maximizing space between rollers, and also can prevent the damage of the idler and the tension controlling cylinder due to the relatively large external shock generated in a moment, and further can deal with the relatively small external shock and vibration so as to provide a comfortable ride to the operator, thereby enhancing the operation efficiency.

To achieve the object of the present invention, the present invention provides an apparatus for controlling tension of a track, including a track frame in which an idler 30-2 and a front roller 20-2 are moved together when controlling the tension of the track; an idler frame 30-1 in which the idler 30-2 is fixed; a roller frame 20-1 in which the front roller 20-2 is fixed; and a buffer member 40 which is disposed between the idler frame 30-1 and the roller frame 20-1 so as to deal with external shock.

Further, the present invention provides an apparatus for controlling tension of a track, including a track frame 10 in which only an idler 30-2 is moved when controlling the tension of the track; an idler frame 30-1 in which the idler 30-2 is fixed; and a buffer member 40 which is disposed between the idler frame 30-1 and a tension controlling cylinder so as to deal with external shock.

[Detailed Description of Main Elements]

| | |
|---|---|
| 10: track frame | 20-1: roller frame |
| 20-2: front roller | 30-1: idler frame |
| 30-2: idler | 40: buffer member |
| 50: tension controlling cylinder | |
| 60: rear roller | |

DESCRIPTION OF SPECIFIC EMBODIMENTS

Hereinafter, the embodiments of the present invention will be described in detail with reference to accompanying drawings.

Hereinafter, the terms and words used in the description as described below are not limited to the typical or dictionary definition, and they can be interpreted as proper meanings and definitions consistent with the technical ideas.

Figure 1:
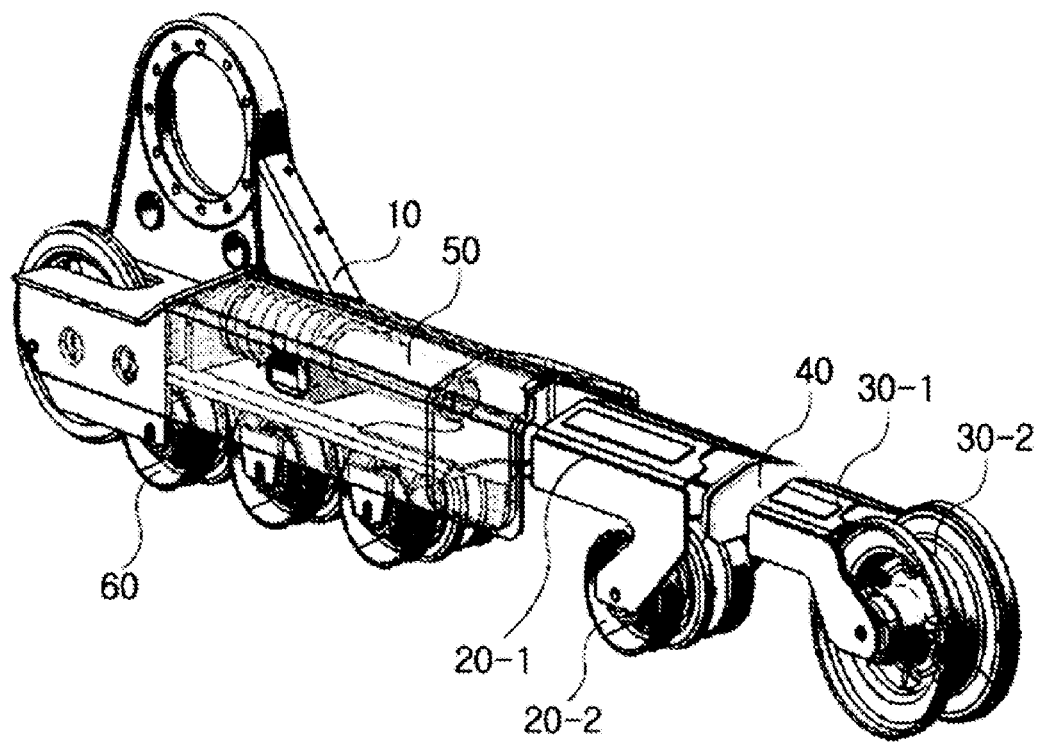
FIG. 1 is a view showing the configuration of an apparatus for controlling tension of a track according to the present invention.

FIG. 1 is a view showing the configuration of an apparatus for controlling tension of a track according to the present invention.

As shown in FIG. 1, the apparatus for controlling the tension of the track includes a track frame 10 which is moved together with an idler 30-2 and a front roller 20-2 when controlling tension of the track, an idler frame 30-1 in which the idler 30-2 is fixed, a roller frame 20-1 in which the front roller 20-2 is fixed, and a buffer member 40 which is disposed between the idler frame 30-1 and the roller frame 20-1 so as to be contracted and expanded when external shock is generated, thereby dealing with the shock.

The track frame 10 may be moved together with the idler 30-2 and the multiple rollers, and the buffer member 40 is located between the idler frame 30-1 and the roller frame 20-1.

Figure 2:
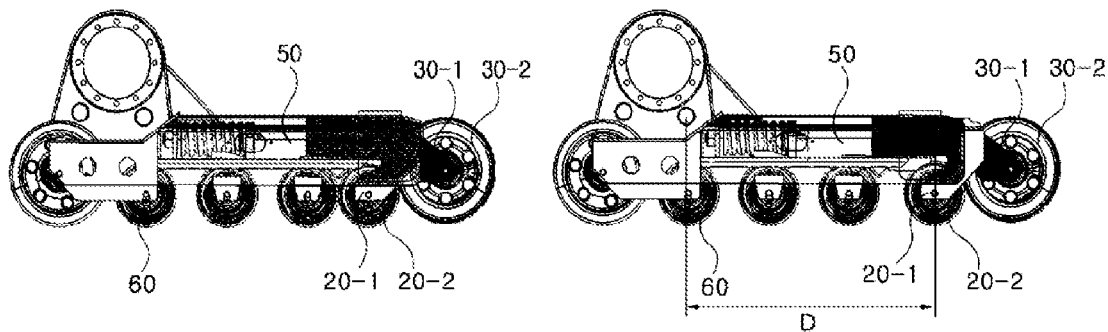
FIG. 2 is a side view of the apparatus for controlling the tension of the track according to the present invention.
Figure 3:
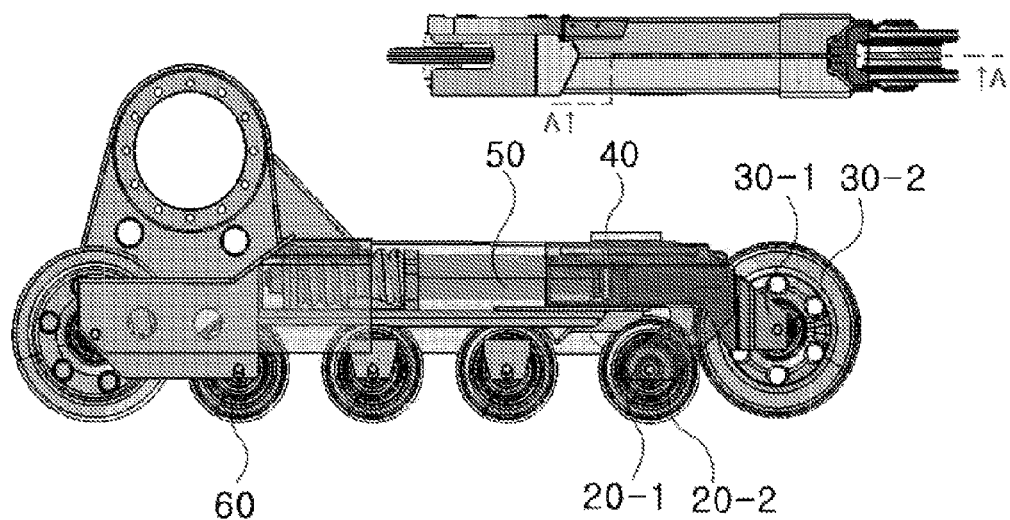
FIG. 3 is a cross-sectional view of the apparatus for controlling the tension of the track according to the present invention.
Figure 4:
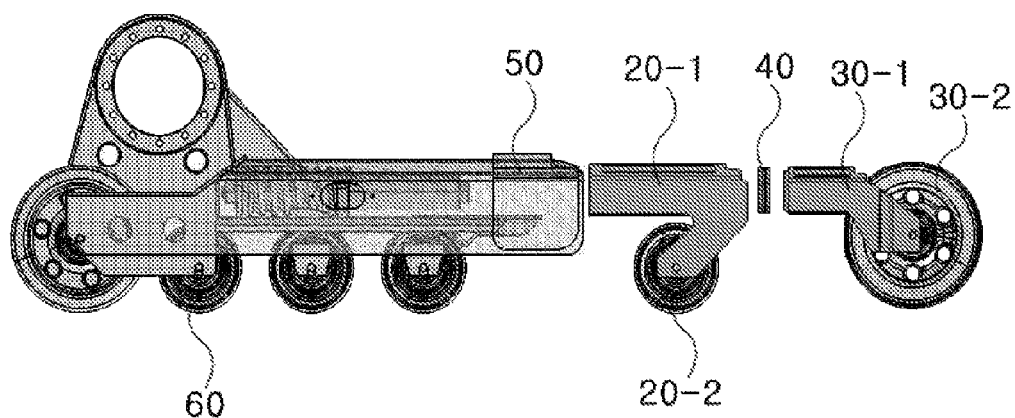
FIG. 4 is an assembling view of the apparatus for controlling the tension of the track according to the present invention.

FIG. 2 is a side view of the apparatus for controlling the tension of the track according to the present invention, FIG. 3 is a cross-sectional view of the apparatus for controlling the tension of the track according to the present invention, and FIG. 4 is an assembling view of the apparatus for controlling the tension of the track according to the present invention.

As shown in FIGS. 2 to 4, when controlling the tension of the track, the idler 30-2 and the front roller 20-2 are moved at the same so as to minimize space between idler 30-2 and the front roller 20-2 and thus to prevent the track from being separated due to an uneven road surface and obstacles on the road surface.

Further, a distance between the front roller 20-2 and the rear roller 60 is maximized so as to stably support the weight of the equipment, thereby improving running performance of the equipment and also providing a comfortable ride and enhanced operation efficiency.

Further, the buffer member 40 is disposed between the idler frame 30-1 for supporting the idler 30-2 and the roller frame 20-1 for supporting the front roller 20-2 so as to prevent damage of the idler 30-2 and the tension controlling cylinder 50 due to relatively large external shock generated in a moment, thereby increasing the durability and also providing the comfortable ride and the enhanced operation efficiency.

The buffer member 40 and the idler frame 30-1 are inserted into the housing type roller frame 20-1. The buffer member 40 is firstly inserted into the roller frame 20-1 and then the idler frame 30-1 is inserted therein. The buffer member 40 is located in the roller frame 20-1 when running the equipment, and thus the damage thereof due to external environments does not occur absolutely and also it cannot be separated to the outside.

Figure 5:
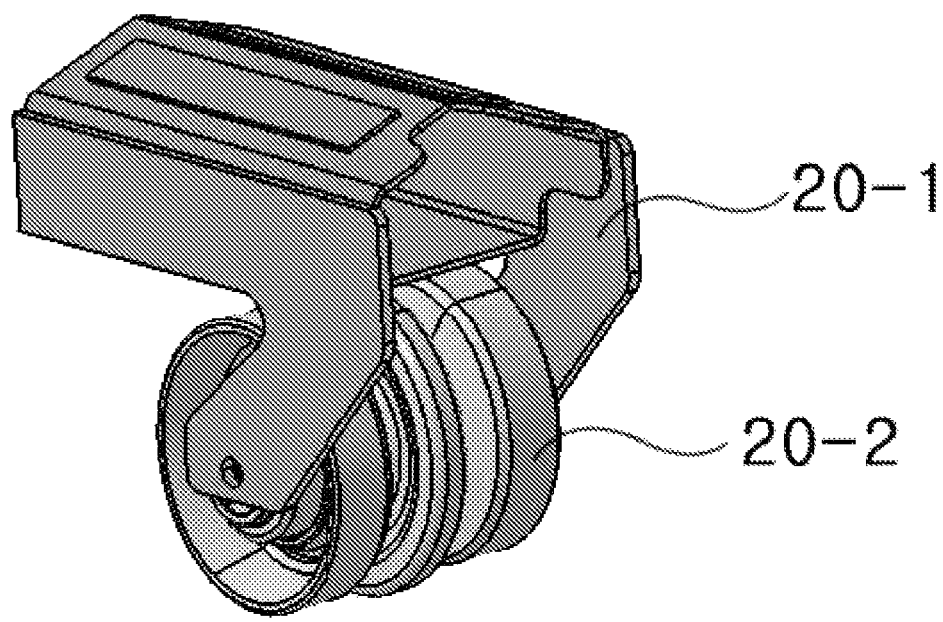
FIG. 5 is a view of a roller supporting frame according to the present invention.
Figure 6:
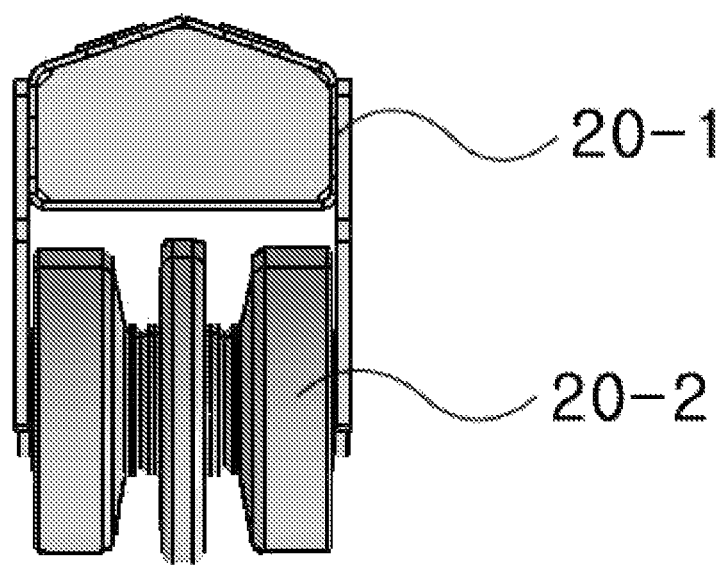
FIG. 6 is a front view of the roller supporting frame according to the present invention.
Figure 7:
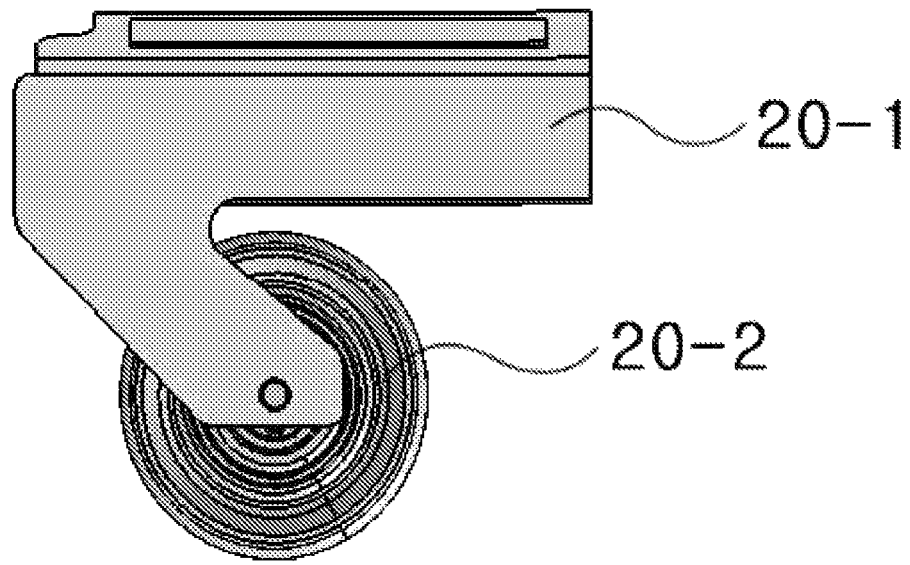
FIG. 7 is a side view of the roller supporting frame according to the present invention.

FIG. 5 is a view of a roller supporting frame according to the present invention, FIG. 6 is a front view of the roller supporting frame according to the present invention, and FIG. 7 is a side view of the roller supporting frame according to the present invention.

As shown in FIGS. 5 to 7, the roller 20-2 is fixed to the roller frame 20-1 for supporting the roller, and when controlling the tension of the track, the idler and the front roller 20-2 are moved at the same time so as to minimize the space between idler and the front roller 20-2, thereby preventing the track from being separated due to the uneven road surface and the obstacles on the road surface and also preventing waste of time due to installation of the track.

Figure 8:
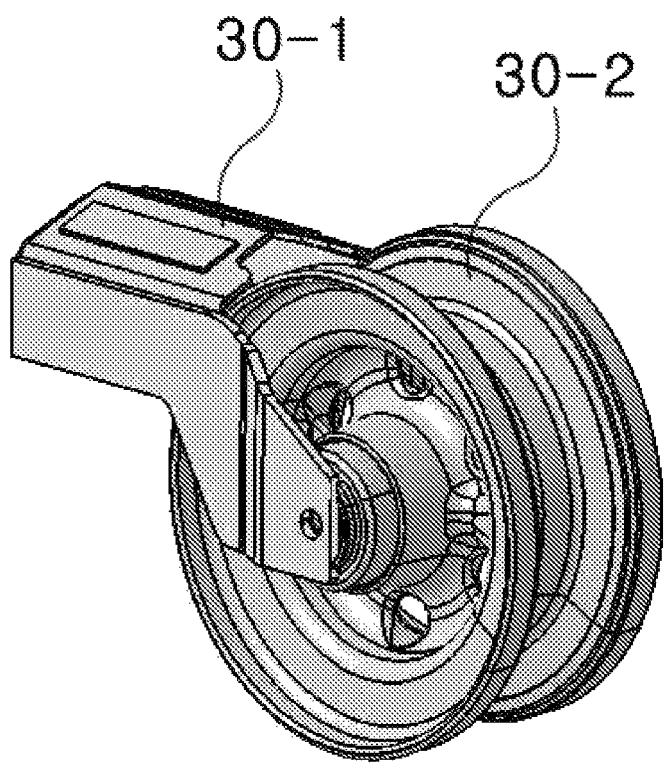
FIG. 8 is a perspective view of an idler supporting frame according to the present invention.
Figure 9:
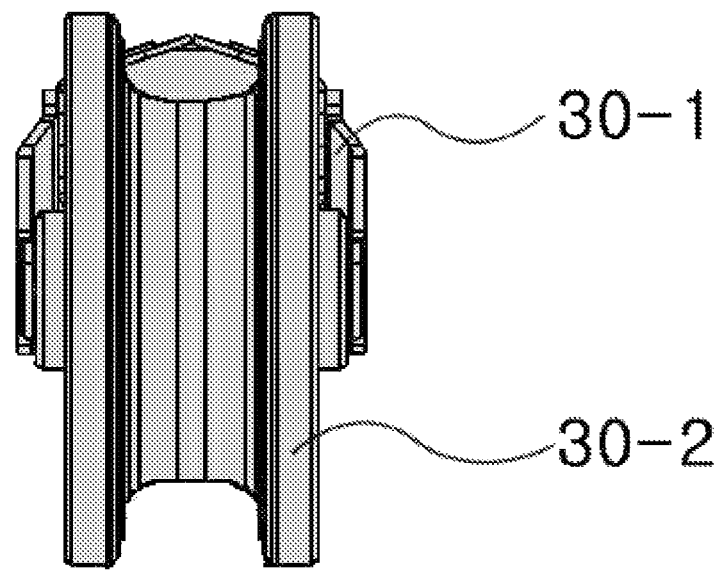
FIG. 9 is a front view of the idler supporting frame according to the present invention.
Figure 10:
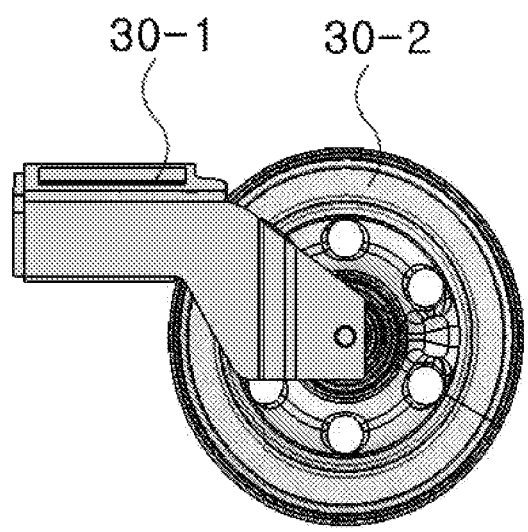
FIG. 10 is a side view of the idler supporting frame according to the present invention.

FIG. 8 is a perspective view of an idler supporting frame according to the present invention, FIG. 9 is a front view of the idler supporting frame according to the present invention, and FIG. 10 is a side view of the idler supporting frame according to the present invention.

As shown in FIGS. 8 to 10, the idler frame 30-1 is provided to support the idler 30-2 so that the idler 30-2 and the front roller can be moved together and thus they are moved at the same time.

The idler 30-2 functions to directly support a caterpillar track. The idler 30-2 is supported by the idler frame 30-1 in which the idler 30-2 is rotatably installed.

Figure 11:
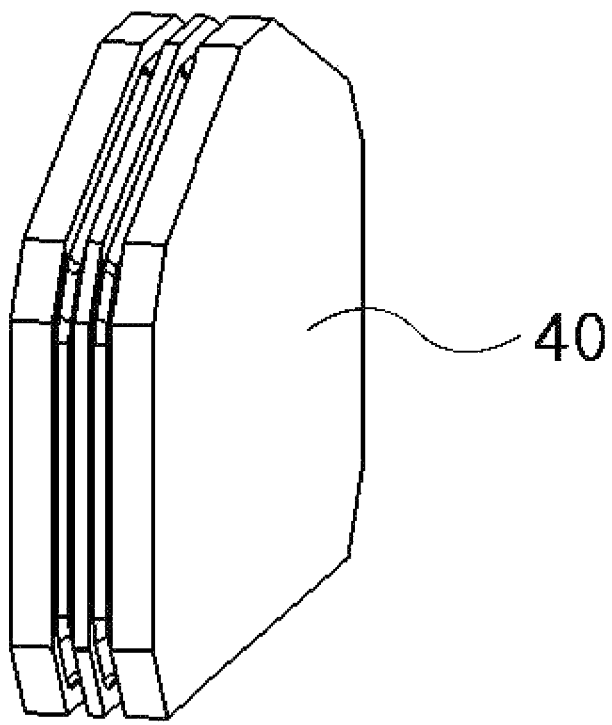
FIG. 11 is a perspective view of a buffer member according to the present invention.
Figure 12:
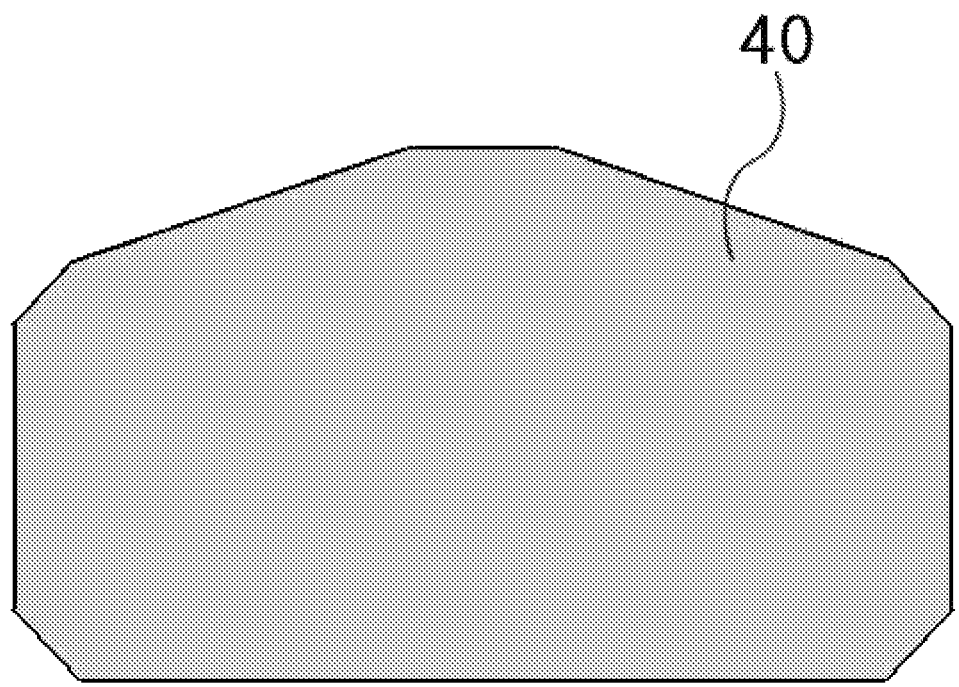
FIG. 12 is a front view of the buffer member according to the present invention.
Figure 13:
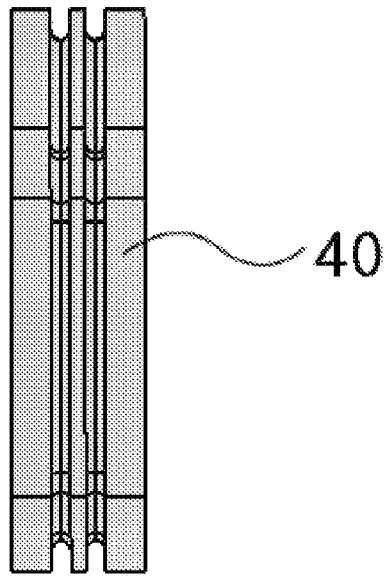
FIG. 13 is a side view of the buffer member according to the present invention.

FIG. 11 is a perspective view of a buffer member according to the present invention, FIG. 12 is a front view of the buffer member according to the present invention, and FIG. 13 is a side view of the buffer member according to the present invention.

As shown in FIGS. 11 to 13, the buffer member 40 is applied between the idler frame 30-1 for supporting the idler 30-2 and the roller frame 20-1 for supporting the front roller 20-2 so as to deal with the external shock. The buffer member 40 may be formed of a synthetic material such as rubber, or may be formed to include a fluid like gas therein.

Figure 14:
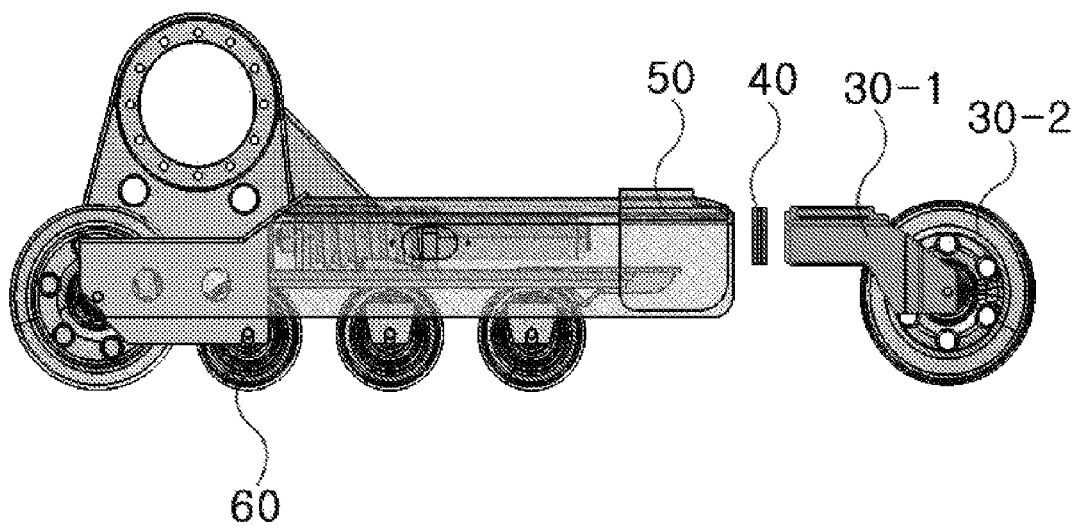
FIG. 14 is an assembling view of the apparatus for controlling the tension of the track, in which only an idler is moved, according to the present invention.

FIG. 14 is an assembling view of the apparatus for controlling the tension of the track, in which only an idler is moved, according to the present invention.

As shown in FIG. 14, even in a structure which controls the tension of the track by moving only the idler frame 30-1 including the idler 30-2 without the front roller 20-2, the buffer member 40 is applied so as to prevent the damage of the tension controlling cylinder 50, thereby increasing the durability and thus providing the comfortable ride and the enhanced operation efficiency.

According to the present invention, since the idler and the roller are moved at the same time when controlling the tension of the track, it is possible to prevent a track wheel from being separated and also to support the weight of the equipment more safely.

Further, since the buffer member for absorbing the shock is disposed between the idler supporting frame and the roller supporting frame, it is possible to prevent the damage of the idler and the tension controlling cylinder due to the relatively large external shock generated in a moment and also to improve the durability and further to deal with the relatively small external shock and vibration so as to provide a comfortable ride to the operator, thereby enhancing the operation efficiency.

While the present invention has been described with respect to the specific embodiments, it will be apparent to those skilled in the art that various changes and modifications may be made without departing from the spirit and scope of the invention as defined in the following claims.

What is claimed is:

1. An apparatus for controlling tension of a track, comprising
   a track frame;
   an idler frame in which an idler is fixed;
   a roller frame in which a front roller is fixed;
   a buffer member;
   a rear roller fixed to the track frame; and
   a tension controlling cylinder, wherein the track frame supports the tension controlling cylinder, roller frame, buffer member and idler frame in that order along a line from a rear of the track frame toward a front of the track frame such that tension controlling cylinder is in contact with the roller frame, the roller frame is in contact with the buffer member opposite the contact between the tension controlling cylinder and the roller frame, and the idler frame is in contact with the buffer member opposite the contact between the roller frame and buffer member, and wherein the tension controlling cylinder, roller frame, buffer member and idler frame are supported by the track frame along the line such that the roller frame and idler frame can be moved together along the line with respect to the track frame and such that the buffer member provides for the buffering of a shock to the idler along the line and toward the tension controlling cylinder.

2. The apparatus of claim 1, wherein the a distance between the front roller and a rear roller is maximized to stably support a machine and also to improve running performance.

3. The apparatus of claim 1, wherein the buffer member is formed of a synthetic material including rubber, and a fluid or gas is provided in the buffer member so that its shape can be changed.

* * * * *